US008947999B2

(12) United States Patent
Leung

(10) Patent No.: US 8,947,999 B2
(45) Date of Patent: Feb. 3, 2015

(54) SHARED PROTECTION METHOD AND APPARATUS FOR RECONFIGURABLE OPTICAL ADD-DROP MULTIPLEXER (ROADM) BASED MESH NETWORKS

(75) Inventor: Dion Kwun Kit Leung, Aurora, IL (US)

(73) Assignee: Tellabs Operations, Inc., Naperville, IL (US)

( * ) Notice: Subject to any disclaimer, the term of this patent is extended or adjusted under 35 U.S.C. 154(b) by 985 days.

(21) Appl. No.: 11/999,502

(22) Filed: Dec. 5, 2007

(65) Prior Publication Data

US 2009/0046572 A1    Feb. 19, 2009

Related U.S. Application Data

(60) Provisional application No. 60/965,109, filed on Aug. 17, 2007.

(51) Int. Cl.
*H04L 12/26* (2006.01)
*H04J 14/02* (2006.01)
(Continued)

(52) U.S. Cl.
CPC ......... *H04J 14/0227* (2013.01); *H04J 14/0284* (2013.01); *H04J 14/0295* (2013.01); *H04L 43/0811* (2013.01); *H04Q 11/0062* (2013.01); *H04J 14/0283* (2013.01); *H04L 41/0668* (2013.01); *H04Q 2011/0081* (2013.01); *H04Q 2011/0098* (2013.01)
USPC ...................................................... 370/216

(58) Field of Classification Search
USPC ........................ 370/216, 228; 398/5; 385/24
See application file for complete search history.

(56) References Cited

U.S. PATENT DOCUMENTS

| | | | |
|---|---|---|---|
| 6,307,986 B1 * | 10/2001 | Duerksen et al. | 385/24 |
| 6,404,734 B1 | 6/2002 | Stamatelakis et al. | |
| 6,760,302 B1 * | 7/2004 | Ellinas et al. | 370/228 |

(Continued)

FOREIGN PATENT DOCUMENTS

WO    WO 2009/025716 A1    2/2009

OTHER PUBLICATIONS

Notification Concerning Transmittal of International Preliminary Report on Patentability and International Preliminary Report on Patentability (8 pages) issued in International Application No. PCT/US2008/009123, on Feb. 24, 2010.

Shen, et al., "Extending the ρ-Cycle Concept to Path Segment Protection for Span and Node Failure Recovery," *IEEE Journal on Selected Areas in Communications*, 21(8): 1306-1319 (2003).

(Continued)

*Primary Examiner* — Mark Rinehart
*Assistant Examiner* — Gbemileke Onamuti
(74) *Attorney, Agent, or Firm* — Hamilton, Brook, Smith & Reynolds, P.C.

(57) ABSTRACT

Example embodiments of a method and corresponding apparatus for sharing protection resources in a reconfigurable optical add-drop multiplexer (ROADM) based mesh network are presented. The use of dedicated 1+1 methodologies for protection in a mesh network is reliable, but requires a large amount of equipment redundancy, as well as a large associated cost. According to the embodiments of the present method and apparatus, the total number of protection transponders needed to support single failures in a mesh network is reduced by implementing a preconfigured protection cycle (p-cycle) in the mesh network and configuring nodes along the p-cycle to share protection transponders. Accordingly, the embodiments of the present method and apparatus allow for reliable protection against single failures while lessening the amount of equipment redundancy and reducing the associated cost.

14 Claims, 21 Drawing Sheets

(51) Int. Cl.
*H04Q 11/00* (2006.01)
*H04L 12/24* (2006.01)

(56) References Cited

U.S. PATENT DOCUMENTS

| | | | |
|---|---|---|---|
| 7,099,578 B1 * | 8/2006 | Gerstel | 398/5 |
| 7,421,197 B2 * | 9/2008 | Palacharla et al. | 398/5 |
| 8,446,815 B2 * | 5/2013 | Grover et al. | 370/216 |
| 2003/0016623 A1 | 1/2003 | Grover et al. | |
| 2007/0153674 A1 * | 7/2007 | Alicherry et al. | 370/216 |

OTHER PUBLICATIONS

Kennington, J.L., et al., "Basic Mathematical Programming Models for Capacity Allocation in Mesh-Based Survivable Networks," *OMEGA*, 35: 629-644 (2007).

"Notification of Transmittal of the International Search Report and The Written Opinion of the International Searching Authority, or the Declaration," mailed Jan. 30, 2009 in International Application PCT/US2008/009123.

* cited by examiner

ORIGIN-DESTINATION PAIRS = {AB, BC, BD, DE, AE, AC, AD, BE}

ORIGIN-DESTINATION PAIRS = {~~AB~~, ~~BC~~, ~~BD~~, ~~DE~~, ~~AE~~, ~~AC~~, ~~AD~~, BE}

SHARED PROTECTION METHOD AND APPARATUS FOR RECONFIGURABLE OPTICAL ADD-DROP MULTIPLEXER (ROADM) BASED MESH NETWORKS

RELATED APPLICATION

This application claims the benefit of U.S. Provisional Application No. 60/965,109, filed on Aug. 17, 2007. The entire teachings of the above application are incorporated herein by reference.

BACKGROUND OF THE INVENTION

A mesh network is a network that employs one of two connection arrangements: a full mesh topology or a partial mesh topology. In a full mesh topology, each node of the network is connected directly to each of the other nodes of the network. In a partial mesh topology, some network nodes are connected to all of the other network nodes, but some of the network nodes are connected only to those other network nodes with which they often exchange a large amount of data. The mesh fiber structure enhances the overall reliability by providing at least two physically disjoint paths between each node pair. For instance, if a node of the mesh network fails, or a link between nodes of the mesh network fails, the rest of the network nodes may continue to communicate with each other, either directly or through one or more intermediate network nodes. One simple solution for surviving such a failure is to employ a 1+1 dedicated protection methodology in the mesh network. In this method of protection, one protection path through the mesh network is allocated for each working path through the mesh network.

SUMMARY OF THE INVENTION

According to one example embodiment of the present invention, a network node in a mesh network includes at least two degrees having working transponders, where a "degree" is defined herein as the physical components of a network node that are involved with a connection to another network node. At least one of the degrees include(s) protection transponders logically hardwired (i.e., attached) to at least one respective adjacent network node along a preconfigured protection cycle in the mesh network, where a "preconfigured protection cycle" (p-cycle) is defined herein as a subset of the nodes in the mesh network that form a ring along which protection traffic is routed. In this example embodiment, the total number of protection transponders of the network node is at least equal to the number of working transponders of the network node needing support in an event of a failure relating to any one of the degrees of the network node. The network node may also include a switch fabric coupled between the working and protection transponders that, in an event of a failure of a given degree, switches traffic from the working transponders of the given degree to at least one protection transponder of at least one other degree of the network node. The network node also includes a control plane that configures the switch fabric to switch traffic from the working transponders of the given degree to the at least one protection transponder of the at least one other degree.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
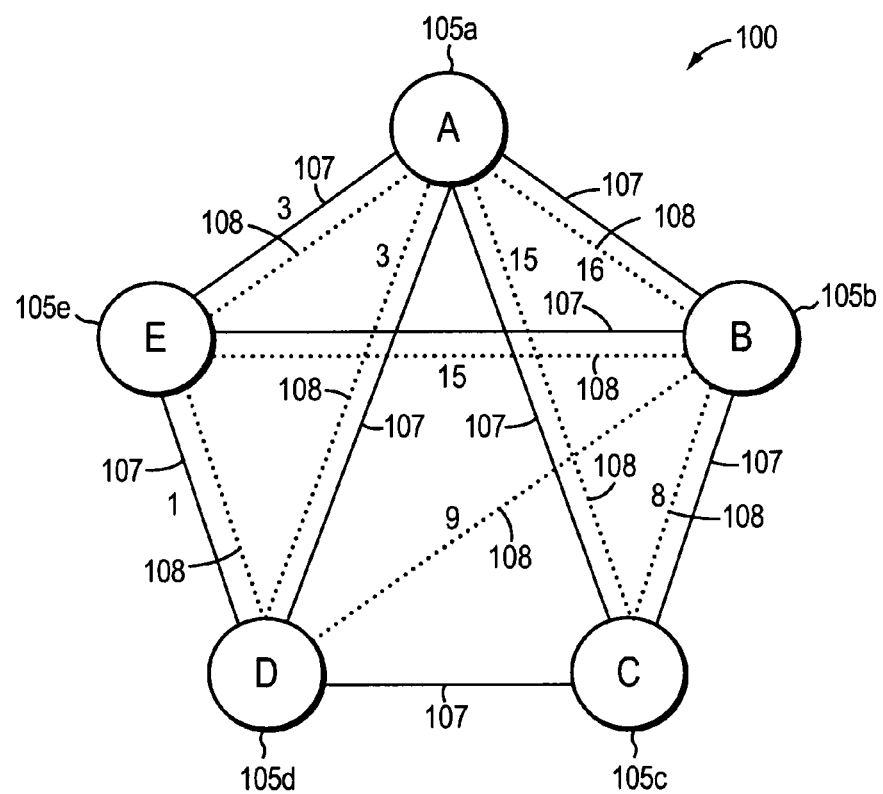
FIG. 1 is a network diagram illustrating traffic demands between various origin-destination pairs of network nodes in a mesh network.

FIG. 1 is a network diagram illustrating traffic demands between various origin-destination pairs of network nodes in a mesh network 100. The mesh network is a partial mesh network and is shown with five nodes (Nodes A-E 105*a-e*) and eight connections 107 (or spans). Each node 105*a-e* is illustrated as a circle, and each physical connection 107 between the nodes 105*a-e* is illustrated as a solid line connecting two of the nodes 105*a-e*. The physical connections 107 may be wired, wireless, or optical. Also shown are example traffic demands 108 between the various origin-destination node pairs (e.g., Node A 105*a* and Node B 105*b*), which are illustrated as dashed lines connecting any two of the nodes 105*a-e*. The magnitudes of the demands 108 are shown as numbers that are situated near the dashed lines. The nodes 105*a-e* of the mesh network 100 also include transponders (not shown) for sending and receiving traffic (not shown) that ride on the demands 108 between the nodes 105*a-e* of the mesh network 100.

In a mesh network topology, a "working path" is typically defined to be a most direct path via physical links 107 between any two nodes 105*a-e*, and a "protection path" is typically defined to be any path between any two nodes 105*a-e* via intermediate nodes 105*a-e* other then the most direct path. Transponders used for sending and receiving traffic along a working path in the network 100 are referred to as "working transponders," and transponders used for sending and receiving traffic along a protection path in the network 100 are referred to as "protection transponders."

Transponders are included in each network node 105*a-e* in at least one of a number of degrees of the network node. The degree of a given node is the number of connections (or spans) that the given node has with other nodes in the network. For example, in FIG. 1, Node E 105*e* has a degree of "three" because it is connected to three other nodes, Node A 105*a*, Node B 105*b*, and Node D 105*d*. The physical components of Node E 105*e* that are involved with any one of these connections 107 may also be referred to in noun form as a "degree." For example, with respect to Node E 105*e*, the physical components of Node E 105*e* that are involved with the connection between Node E 105*e* and Node A 105*a* may be referred to as "Degree A." Likewise, the physical components of Node E 105*e* that are involved with the connection between Node E 105*e* and Node B 105*b* may be referred to as "Degree B," and the physical components of Node E 105*e* that are involved with the connection between Node E 105*e* and Node D 105*d* may be referred to as "Degree D."

Figure 2A:
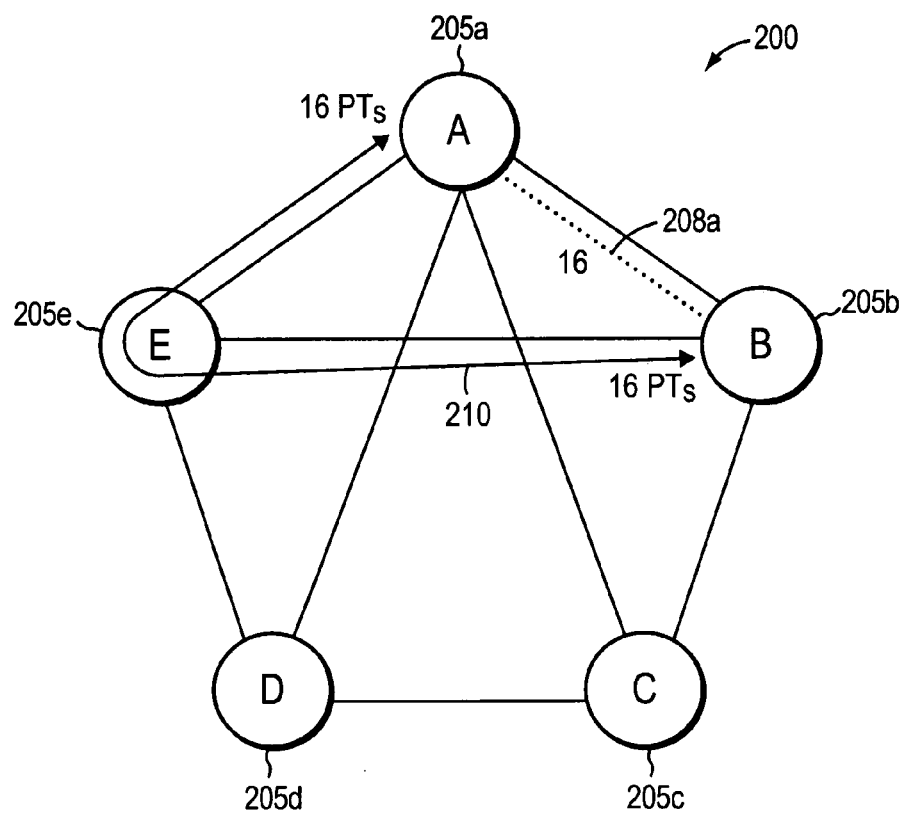
FIGS. 2A-2C are network diagrams illustrating a 1+1 dedicated protection methodology in a mesh network.
Figure 2B:
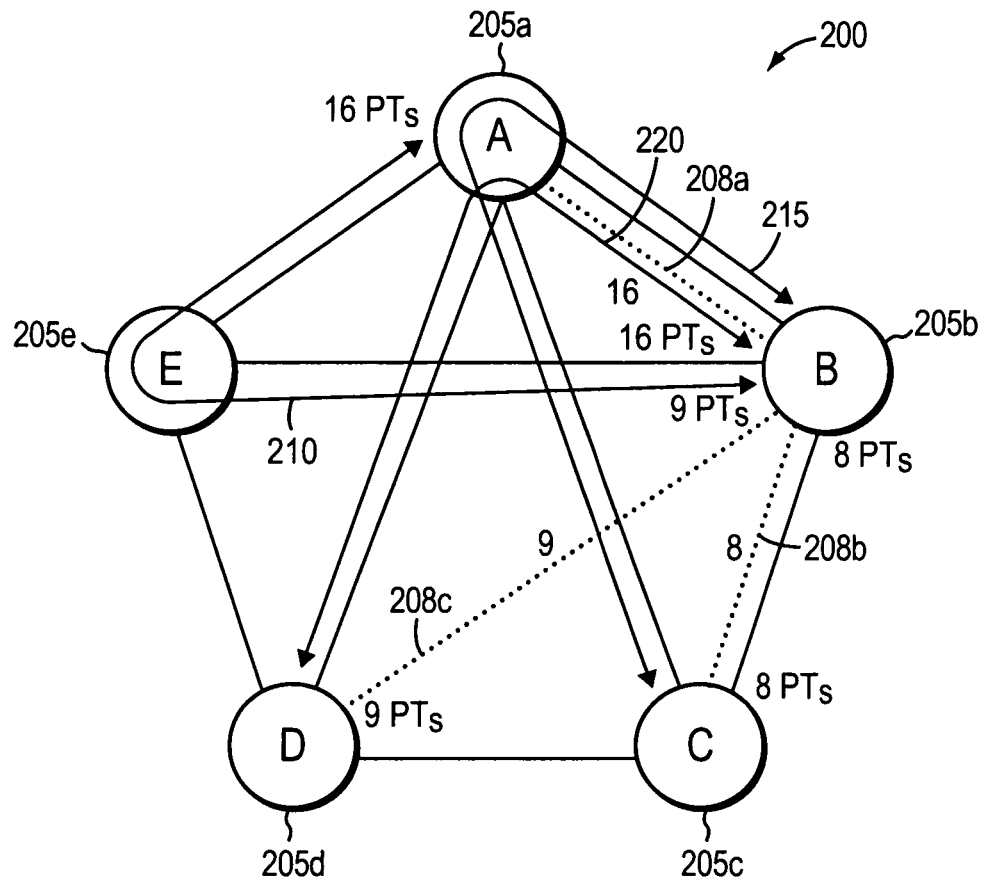
Figure 2C:
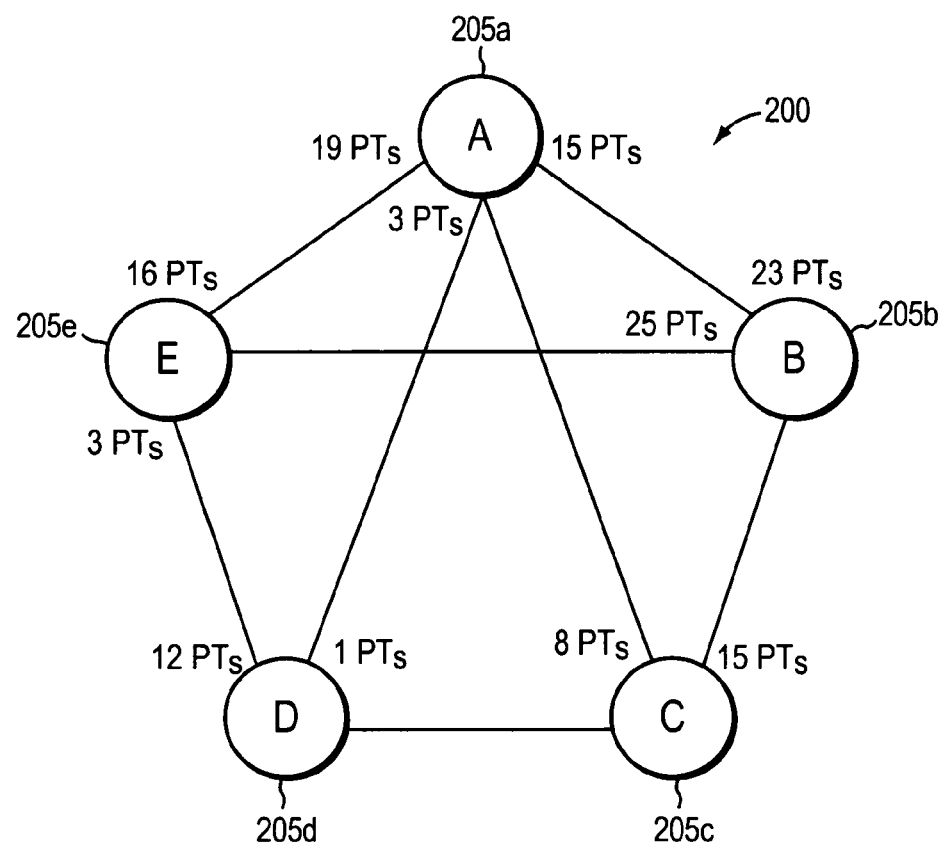

FIGS. 2A-2C are network diagrams illustrating a 1+1 dedicated protection methodology in a mesh network 200, which has the same topology as the mesh network 100 of FIG. 1. In such a dedicated protection methodology, the number of transponders used for protection traffic (protection transponders) is equal to the number of transponders used for working traffic (working transponders), providing 100% equipment redundancy.

FIG. 2A shows a traffic demand 208*a* of 16 for the path between Node A 205*a* and Node B 205*b* (path A-B). To satisfy the demand 208*a*, 16 working transponders are allocated at Degree B of Node A 205*a* and 16 working transponders are allocated at Degree A of Node B 205*b*. Protection path A-E-B 210 is determined for working path A-B, and 16 protection transponders are allocated at Degree E of Node A 205*a* and 16 protection transponders are allocated at Degree E of Node B 205*b*.

FIG. 2B shows two additional traffic demands 208*b*, 208*c* for two other paths in the mesh network 200: a demand 208*b* of 8 for the path between Node B 205*b* and Node C 205*c* (path B-C), and a demand 208*c* of 9 for the path between Node B 205*b* and Node D 205*d* (path B-C-D). To satisfy the demands 208*b*, 208*c*, 17 (8+9) working transponders are allocated at Degree C of Node B 205*b*, 8 working transponders are allocated at Degree B of Node C 205*c*, and 9 working transponders are allocated at Degree C of Node D 205*d*. Protection path B-A-C 215 is determined for working path B-C, where 8 protection transponders are allocated at Degree A of Node B 205*b* and 8 protection transponders are allocated at Degree A of Node C 205*c*. Likewise, protection path B-A-D 220 is determined for working path B-C-D, where 9 additional protection transponders are added to Degree A of Node B 205*b* and 9 protection transponders are allocated at Degree A of Node D 205*d*.

FIG. 2C shows an example placement of protection transponders using the 1+1 dedicated protection methodology. Dedicated protection is a reliable method for providing protection, but is associated with higher equipment redundancy because one protection transponder is needed for each working transponder in the network. In contrast, embodiments of the present invention allows for sharing of protection transponders among multiple working transponders. Hence the total number of protection transponders in the network is reduced; thus, the cost associated with the number of protection transponders in the network is reduced.

Figure 3:
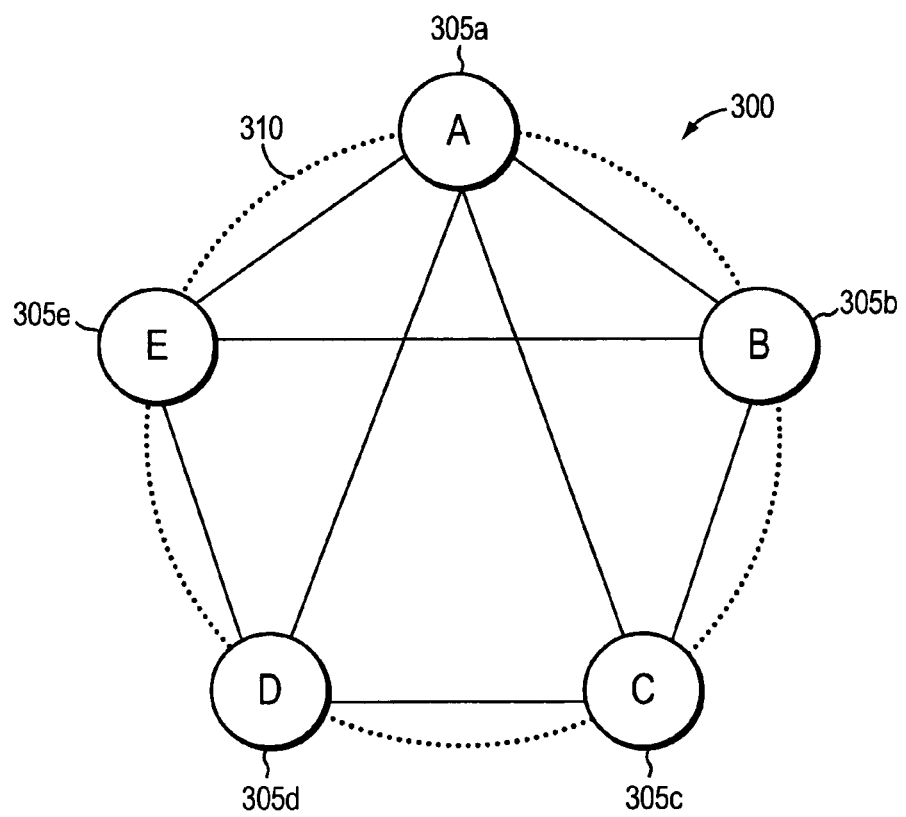
FIG. 3 is a network diagram illustrating a preconfigured protection cycle in a mesh network.

FIG. 3 is a network diagram with multiple nodes 305*a*-*e* illustrating a preconfigured protection cycle (p-cycle) 310 in a mesh network 300. According to p-cycle methodology, working traffic is routed through the network as is normally performed in a mesh network; however, the protection traffic is only routed along nodes 305*a*-*e* that form the p-cycle 310. The nodes 305*a*-*e* of the p-cycle 310 form a predetermined ring illustrated in FIG. 3 by a dotted line in the mesh network 300. During a failure in the mesh network 300, an origin node switches the traffic destined for a destination node along a working path to a protection path along the p-cycle 310 towards the destination node. All of the intermediate nodes along the p-cycle 310 simply forward the traffic along the p-cycle 310 via an optical bypass, without making any decisions as to how to route the traffic, until the traffic arrives at the destination node. It should be noted that if the failure in the network does not involve any node or link that is part of the p-cycle 310, then protection traffic may be sent in both directions around the p-cycle 310. The use of such a p-cycle allows the mesh network 300 to have fast restoration speed, much like that of a ring network.

Figure 4:
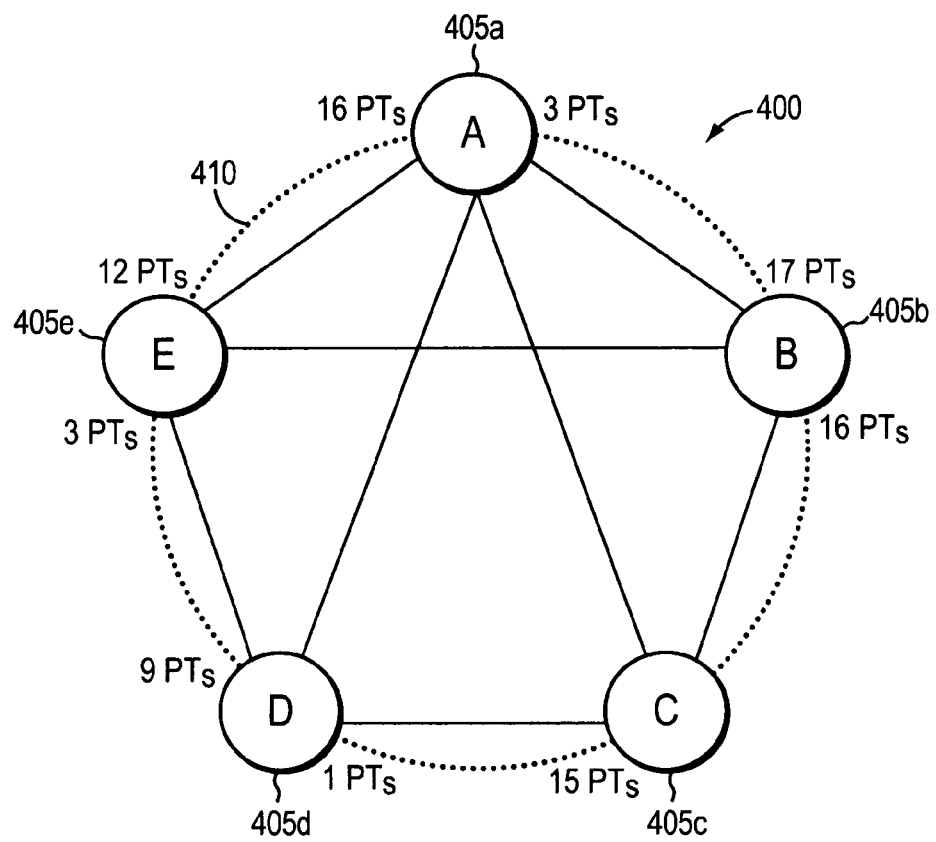
FIG. 4 is a network diagram illustrating a preconfigured protection cycle in a mesh network with network nodes configured to share protection transponders.

FIG. 4 is a network diagram illustrating a preconfigured protection cycle (p-cycle) 410 in a mesh network 400 with network nodes 405*a*-*e* configured to share protection transponders, according to an example embodiment of the present invention. Because protection traffic is only to be sent to nodes that are part of the p-cycle 410, protection transponders need only be allocated for the degrees of the nodes that forward traffic in the direction of the other nodes in the p-cycle 410. For example, protection transponders need only be included in Degree A and Degree D of Node E 405*e*. The example embodiment also shares protection transponders among different protection paths along the p-cycle 410. This results in a reduction of the total number of protection transponders in the mesh network 400. For example, the 1+1 dedicated protection methodology illustrated in FIG. 2C requires a total of 140 protection transponders, while the protection methodology of the example embodiment illustrated in FIG. 4 requires only 92 protection transponders, resulting in a 34% reduction in the total number of protection transponders. The example embodiment provides for demands to be fully protected against single failures. Further, because capacity is not dedicated for protection in the example network 400, the unused capacity may be made available for low-priority, preemptable traffic. Even further, fast restoration times may be achieved because protection routes are known in advance and do not have to be determined dynamically.

In one example embodiment of the present invention, a mesh network is configured to share protection transponders by identifying origin-destination node pairs and working paths in the mesh network. At least one preconfigured protection cycle (p-cycle) that includes at least a subset of the nodes in the mesh network is also identified. For each working path having an origin node and a destination node in the mesh network, at least one protection path between the origin node and the destination node along the p-cycle is determined, as well as a certain number of protection transponders needed to support the working path in an event of a failure along the working path. For each determined protection path, the certain number of protection transponders is associated with a direction of the protection path, or degree, at the origin node and a direction of the protection path at the destination node. For each determined protection path, the example embodiment reuses (shares) any previously allocated transponders at the origin node for the degree in the direction of the protection path and any previously allocated transponders at the destination node for the degree in the direction of the protection path. In an event that fewer than the certain number of transponders have previously been allocated at the origin node for the degree in the direction of the protection path, additional transponders are allocated at the origin node for the degree in the direction of the protection path. Likewise, in an event that fewer than the certain number of transponders have previously been allocated at the destination node for the degree in the direction of the protection path, additional transponders are allocated at the destination node for the degree in the direction of the protection path.

In determining the at least one protection path, the example embodiment may base the determination on the number of previously allocated transponders at the origin node and the number of previously allocated transponders at the destination node, and may determine multiple protection paths between the origin node and the destination node along the p-cycle. In the case where multiple protection paths are determined, the example embodiment may choose from among the multiple protection paths based on the number of previously allocated transponders at the origin node and the number of previously allocated transponders at the destination node, or may allocate additional protection transponders at the origin or destination nodes for the degrees in the directions of each of the multiple protection paths. If allocating additional protection transponders for each of the multiple protection paths, the example embodiment may evenly distribute the allocated protection transponders between each of the multiple protection paths.

Figure 5A:
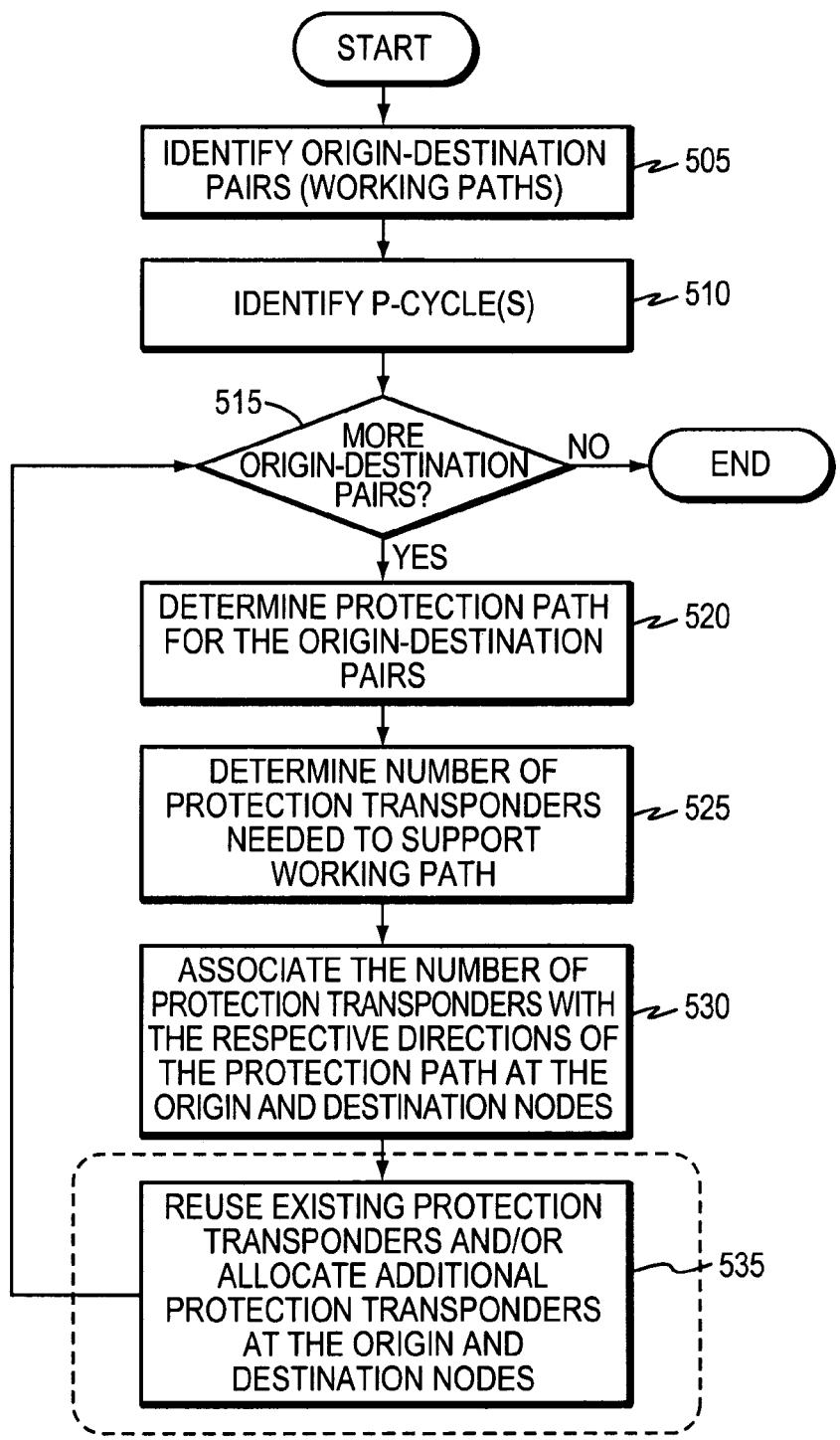
FIGS. 5A-5B are flow diagrams illustrating configuring network nodes of a mesh network to share protection transponders.
Figure 5B:
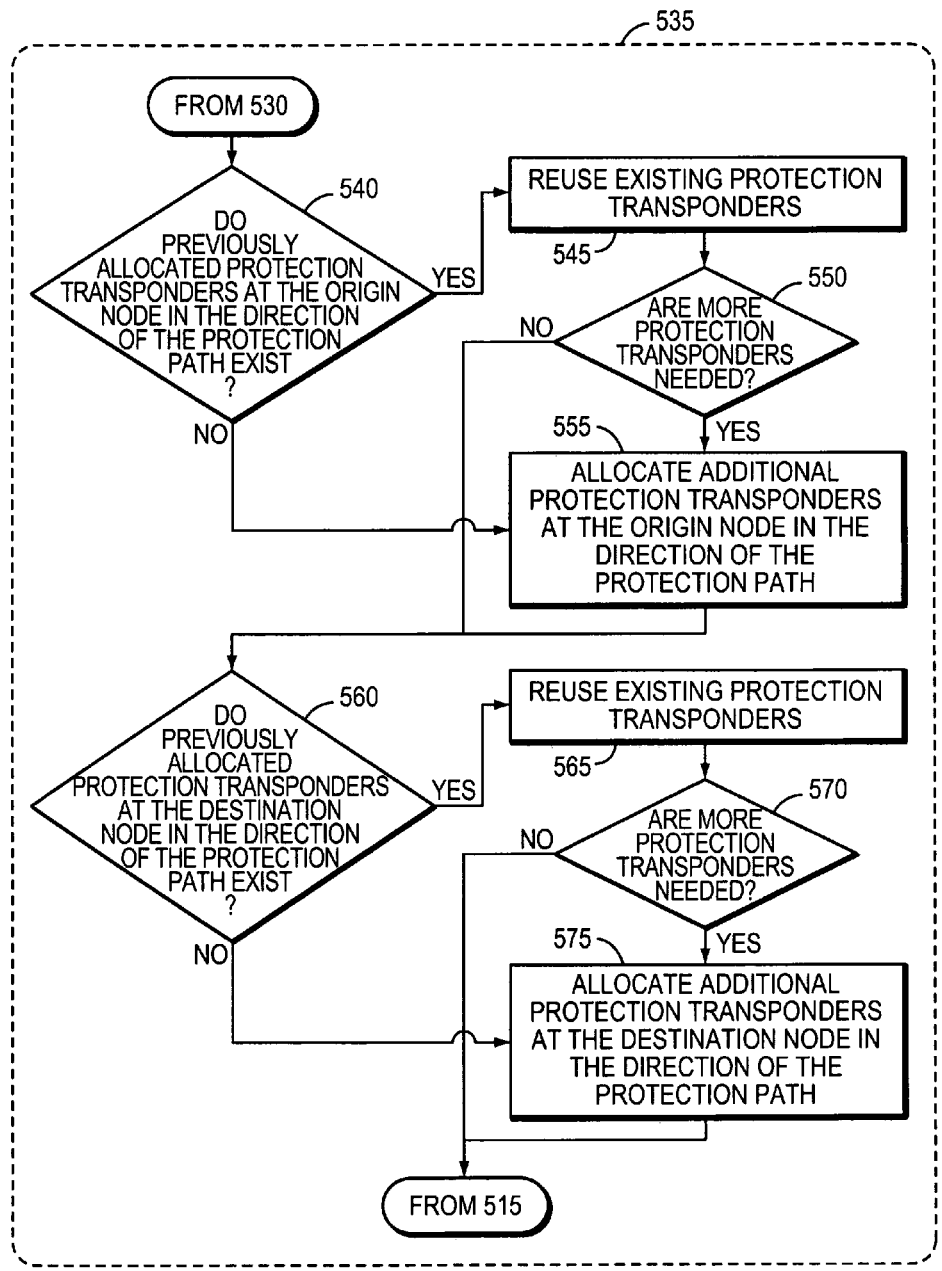

FIGS. 5A-5B are flow diagrams illustrating configuring network nodes of a mesh network to share protection transponders, according to an example embodiment of the present invention. To configure the mesh network to share protection transponders, origin-destination node pairs and working paths in the mesh network are identified (505), as well as at least one preconfigured protection cycle (p-cycle) (510). For each origin-destination pair (515), at least one protection path along the p-cycle supporting the working path between the origin and destination nodes of the origin-destination pair is determined (520). A number of total protection transponders needed to support the associated working path is then determined, as well as the distribution of the protection transponders among the protection paths (if more than one protection path is determined) (525). For each determined protection path along the p-cycle, the determined number of protection transponders is associated with a degree of the origin node that is oriented in the direction of the protection path along the p-cycle. The determined number of protection transponders is also associated with a degree of the destination node that is oriented in the direction of the protection path along the p-cycle (530).

Once the determined number of protection transponders have been associated with their respective degrees of their respective network nodes, the example embodiment determines whether any existing protection transponders may be reused for the protection path, and whether additional protection transponders need to be allocated for the protection path (535). In doing so, the example embodiment determines whether there are any previously allocated protection transponders at the origin node in the direction(s) of the protection path(s) (540). If so, as many protection transponders as possible are reused; that is, up to the determined number of protection transponders needed for the particular degree of the origin node associated with the particular protection path are reused (545). The example embodiment then determines whether more protection transponders are needed for the particular degree of the origin node (550). If more protection transponders are needed, the example embodiment allocates the required number of additional protection transponders for the particular degree of the origin node (555). Likewise, the example embodiment determines whether there are any previously allocated protection transponders at the destination node in the direction(s) of the protection path(s) (560). If so, as many protection transponders as possible are reused; that is, up to the determined number of protection transponders needed for the particular degree of the destination node associated with the particular protection path are reused (565). The example embodiment then determines whether more protection transponders are needed for the particular degree of the destination node (570). If more protection transponders are needed, the example embodiment allocates the required number of additional protection transponders for the particular degree of the destination node (575). The example embodiment repeats the above determinations and allocations for each origin-destination node pair.

FIGS. 6A-6I are network diagrams illustrating configuring network nodes of a mesh network to share protection transponders, according to an example embodiment of the present invention.

Figure 6A:
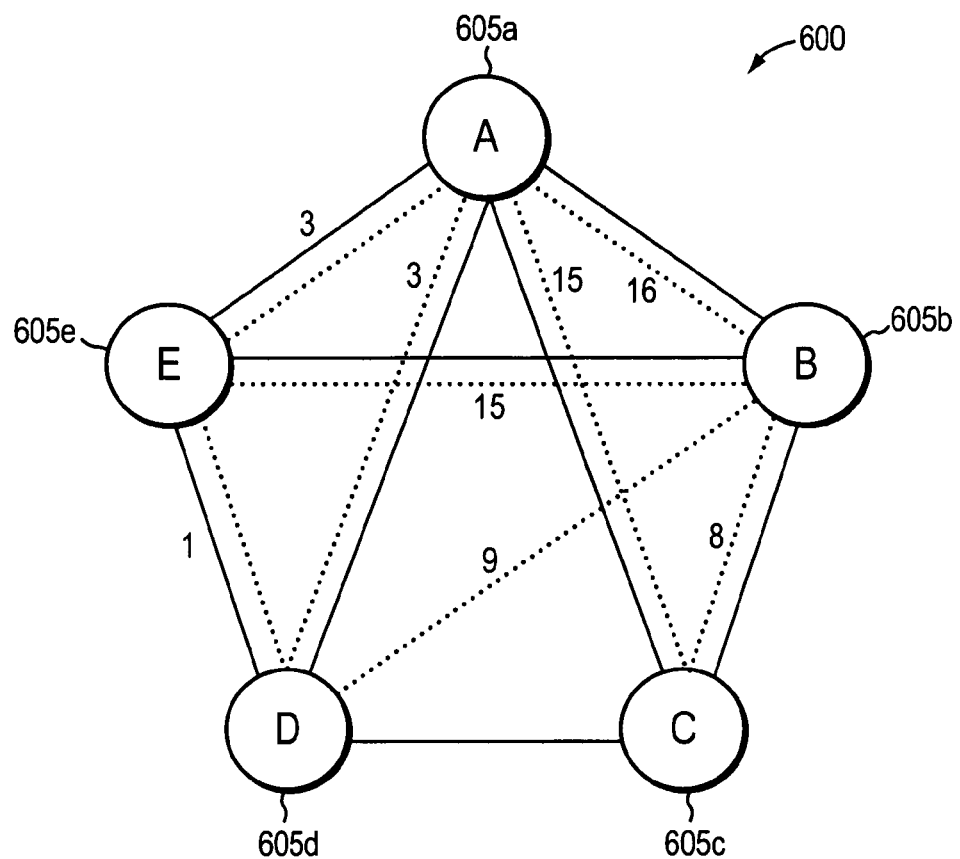
FIGS. 6A-6I are network diagrams illustrating configuring network nodes of a mesh network to share protection transponders.

FIG. 6A shows a mesh network 600, which has the same configuration as the mesh network of FIG. 1, with demands indicated for various working paths between nodes 605a-e in the mesh network. Also indicated is a set of origin-destination node pairs 602 associated with the working paths between the nodes 605a-e of the network. Not shown for the sake of simplicity is a preconfigured protection cycle (p-cycle) that includes Nodes A-E 605a-e and the connections between Nodes A-E 605a-e around the outer perimeter of the network, similar to the p-cycle illustrated in FIGS. 3 and 4.

Figure 6B:
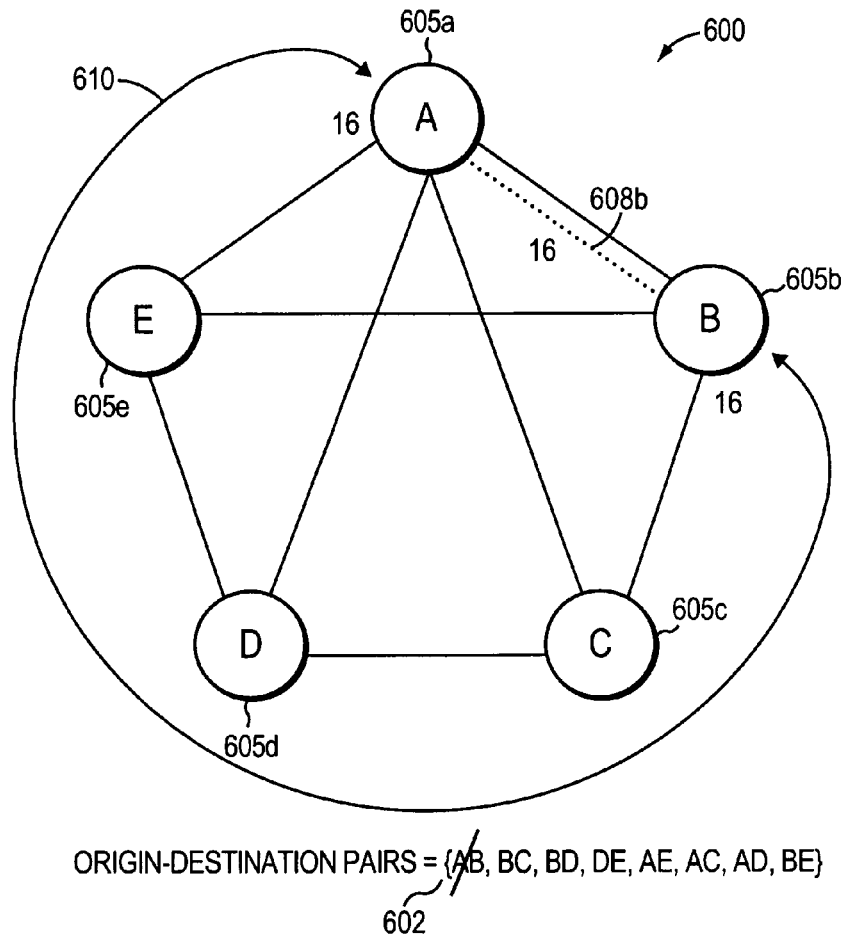

FIG. 6B shows a traffic demand 608b of 16 along a working path between Node A 605a and Node B 605b (path A-B) in the mesh network 600. Also shown is a protection path (path A-E-D-C-B) 610 along the p-cycle determined by the example embodiment. To support the working path A-B, the example embodiment allocates 16 protection transponders at Degree E of Node A 605a and allocates 16 protection transponders at Degree C of Node B 605b.

Figure 6C:
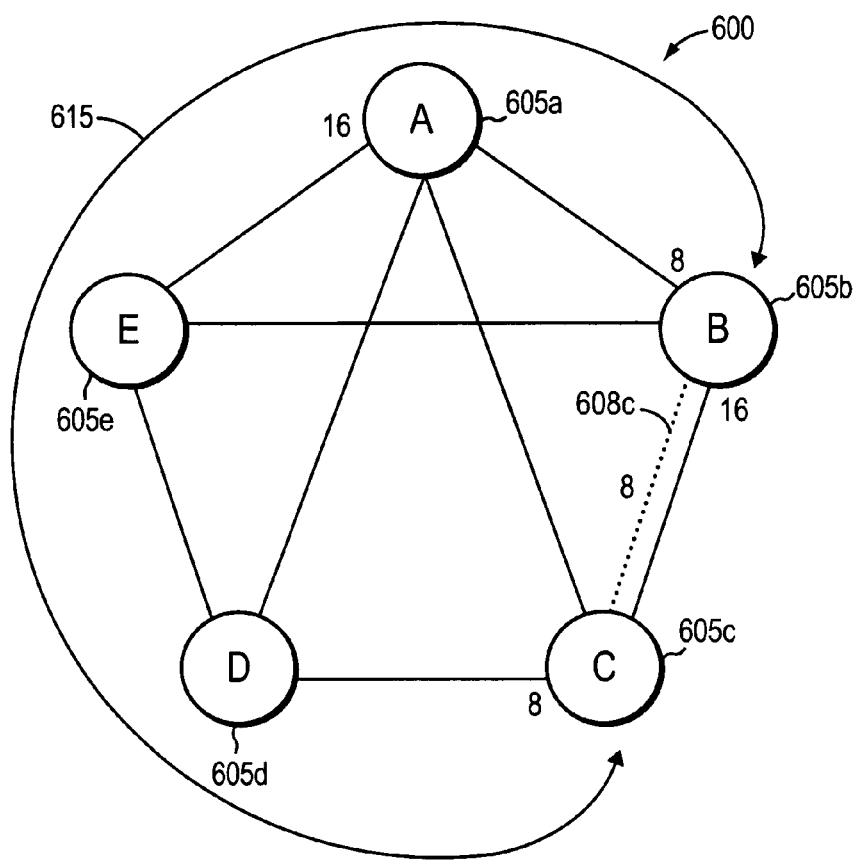

FIG. 6C shows a traffic demand 608c of 8 along a working path between Node B 605b and Node C 605c (path B-C) in the mesh network 600. Also shown is a protection path (path B-A-E-D-C) 615 along the p-cycle determined by the example embodiment. To support the working path B-C, the example embodiment allocates 8 protection transponders at Degree A of Node B 605b and allocates 8 protection transponders at Degree D of Node C 605c.

Figure 6D:
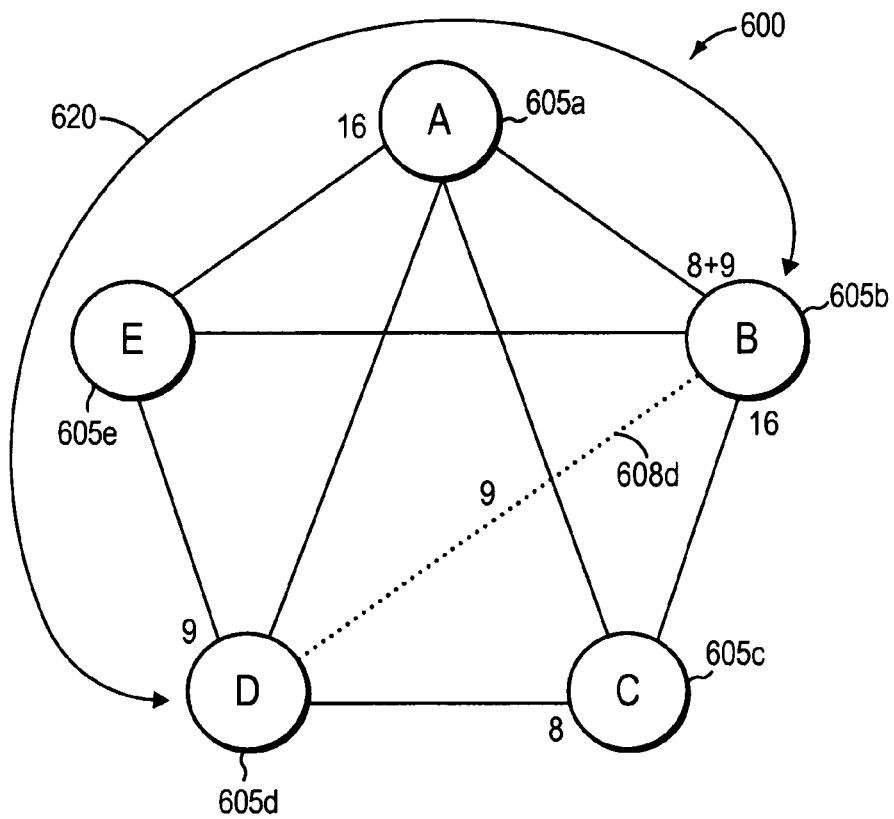

FIG. 6D shows a traffic demand 608d of 9 along a working path between Node B 605b and Node D 605d (path B-C-D) in the mesh network 600. Also shown is a protection path (path B-A-E-D) 620 along the p-cycle determined by the example embodiment. To support the working path B-C-D, the example embodiment allocates 9 additional protection transponders at Degree A of Node B 605b because the 8 existing protection transponders may not be reused as they may already be in use due to a failure between Node B 605b and Node C 605c. The example embodiment also allocates 9 protection transponders at Degree E of Node D 605d.

Figure 6E:
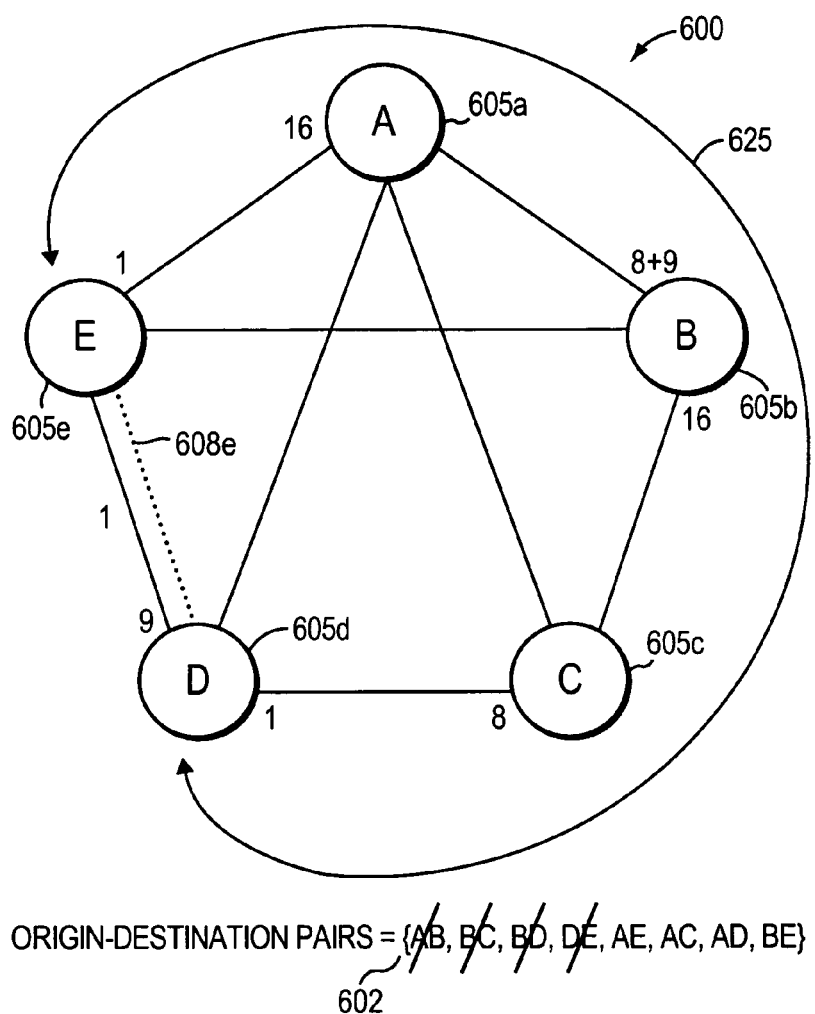

FIG. 6E shows a traffic demand 608e of 1 along a working path between Node D 605d and Node E 605e (path D-E) in the mesh network 600. Also shown is a protection path (path D-C-B-A-E) 625 along the p-cycle determined by the example embodiment. To support the working path D-E, the example embodiment allocates 1 protection transponder at Degree C of Node D 605d and allocates 1 protection transponder at Degree A of Node E 605e.

Figure 6F:
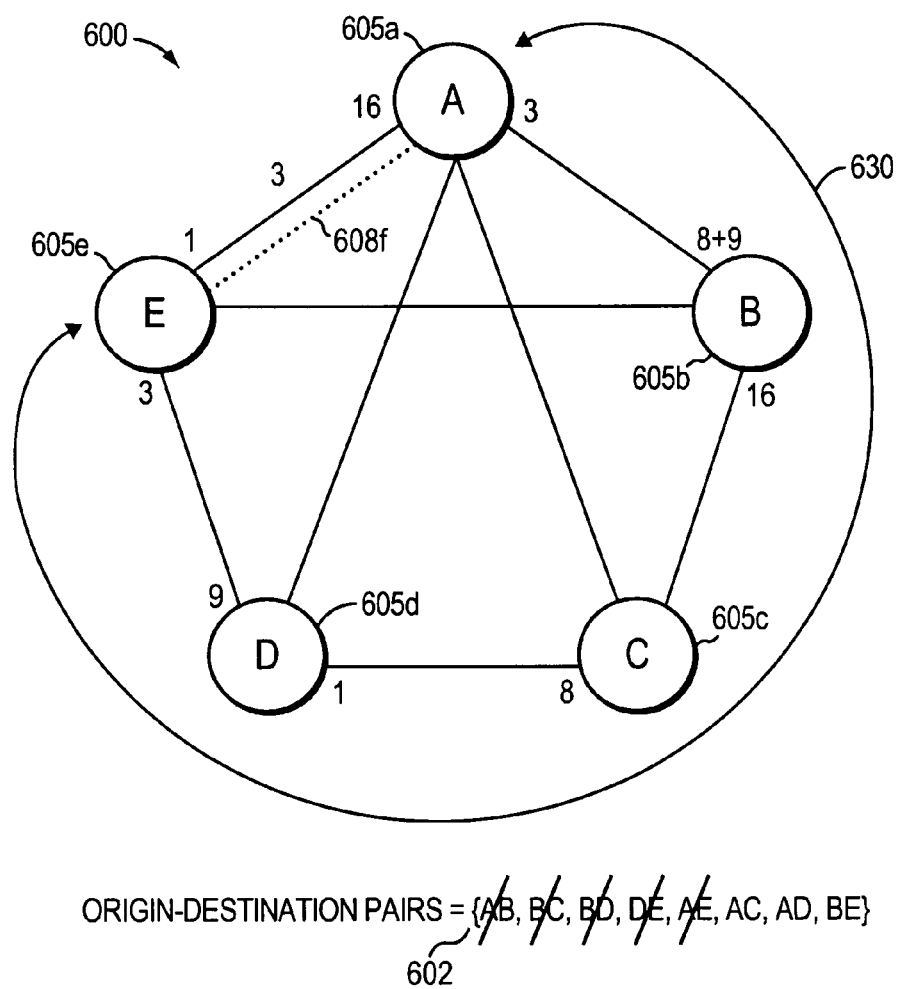

FIG. 6F shows a traffic demand 608f of 3 along a working path between Node A 605a and Node E 605e (path A-E) in the mesh network 600. Also shown is a protection path (path A-B-C-D-E) 630 along the p-cycle determined by the example embodiment. To support the working path A-E, the example embodiment allocates 3 protection transponders at Degree B of Node A 605a and allocates 3 protection transponders at Degree D of Node E 605e.

Figure 6G:
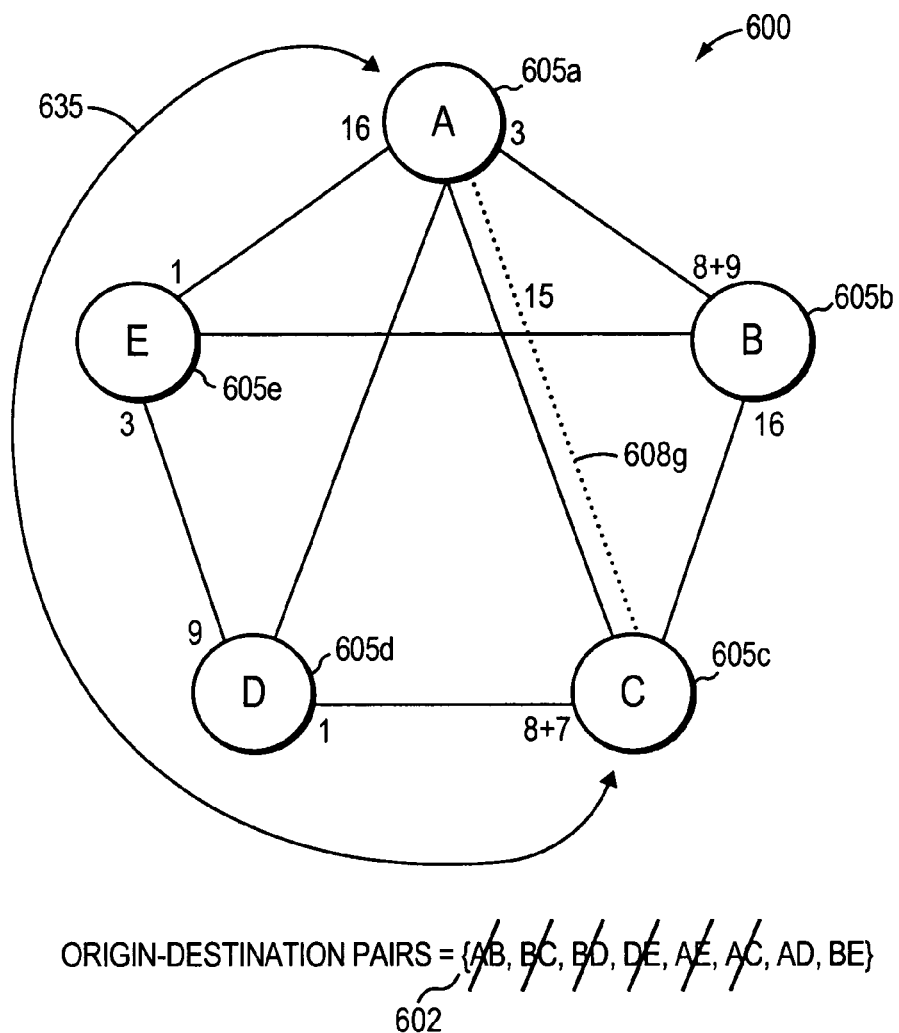

FIG. 6G shows a traffic demand 608g of 15 along a working path between Node A 605a and Node C 605c (path A-C) in the mesh network 600. Also shown is a protection path (path A-E-D-C) 635 along the p-cycle determined by the example embodiment. To support the working path A-C, the example embodiment reuses 15 of the 16 protection transponders previously allocated at Degree E of Node A 605a and reuses the 8 protection transponders previously allocated at Degree D of Node C 605c. The example embodiment must also allocate 7 additional protection transponders at Degree D of Node C 605c.

Figure 6H:
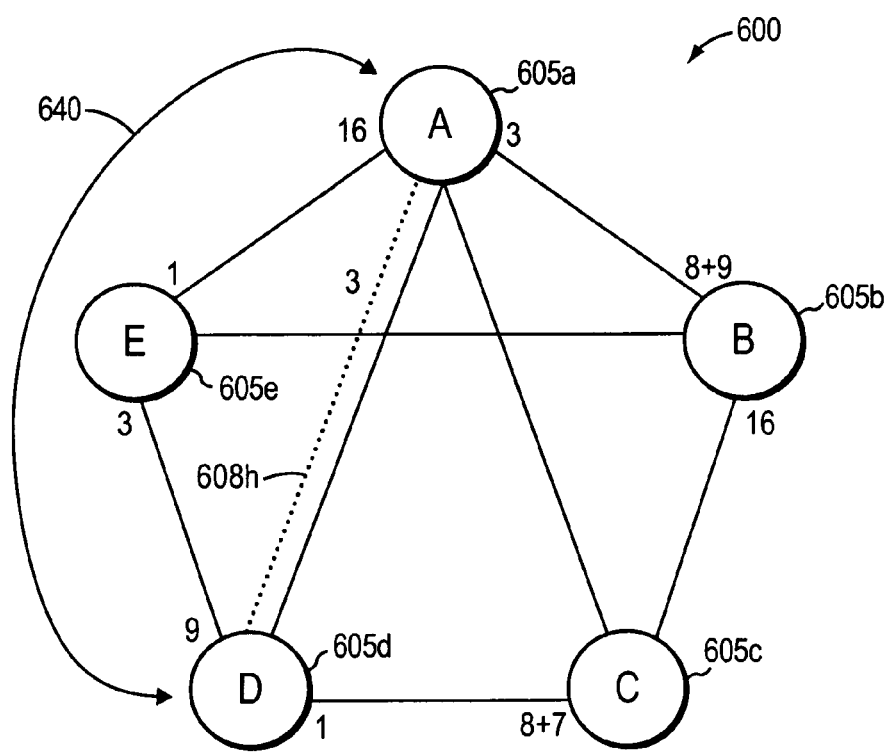

FIG. 6H shows a traffic demand 608h of 3 along a working path between Node A 605a and Node D 605d (path A-D) in the mesh network 600. Also shown is a protection path (path A-E-D) 640 along the p-cycle determined by the example embodiment. To support the working path A-D, the example embodiment reuses 3 of the 16 protection transponders previously allocated at Degree E of Node A 605a and reuses 3 of the 9 protection transponders previously allocated at Degree E of Node D 605d.

Figure 6I:
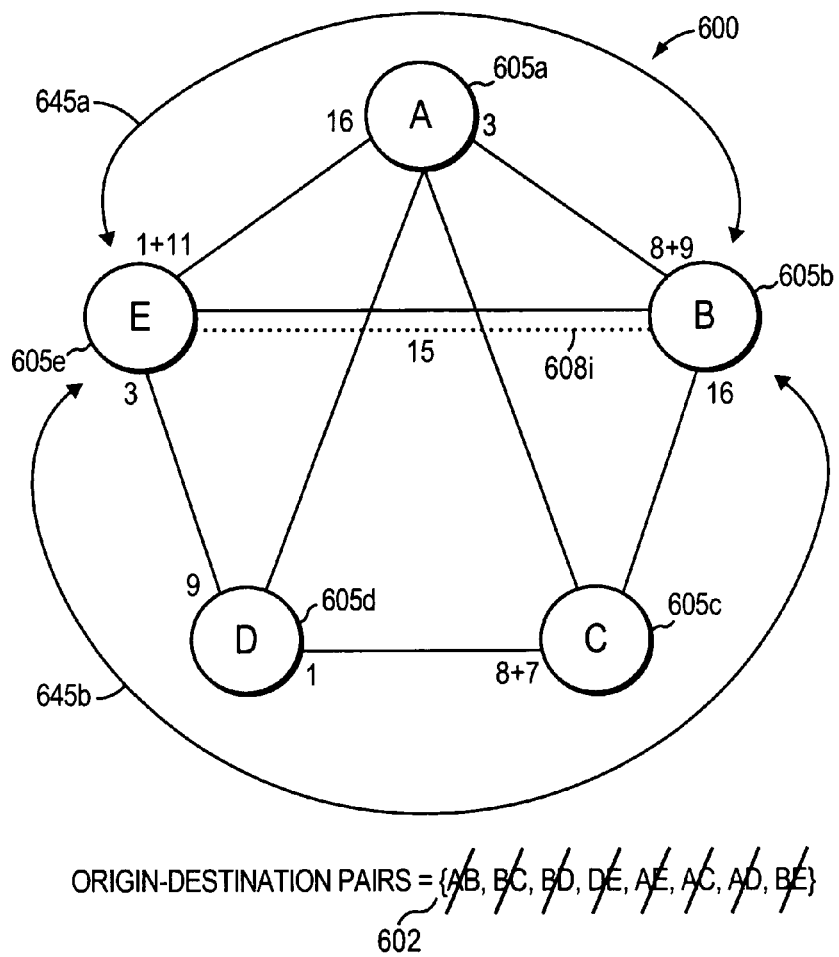

FIG. 6I shows a traffic demand 608i of 15 along a working path between Node B 605b and Node E 605e (path B-E) in the mesh network 600. Also shown are two protection paths (path B-A-E 645a and path B-C-D-E 645b) along the p-cycle determined by the example embodiment. The example embodiment distributes the protection demand between the two protection paths 645a-b such that protection path 645a supports a demand of 12 and protection path 645b supports a demand of 3. To support the working path B-E along protection path 645a, the example embodiment reuses 15 of the 17 protection transponders previously allocated at Degree A of Node B 605b and reuses the 1 protection transponder already allocated at Degree A of Node E 605e. The example embodiment must also allocate 11 additional protection transponders at Degree A of Node E 605e. To support the working path B-E along protection path 645b, the example embodiment reuses 3 of the 16 protection transponders previously allocated at Degree C of Node B 605b and reuses the 3 protection transponders already allocated at Degree D of Node E 605e.

Figure 7A:
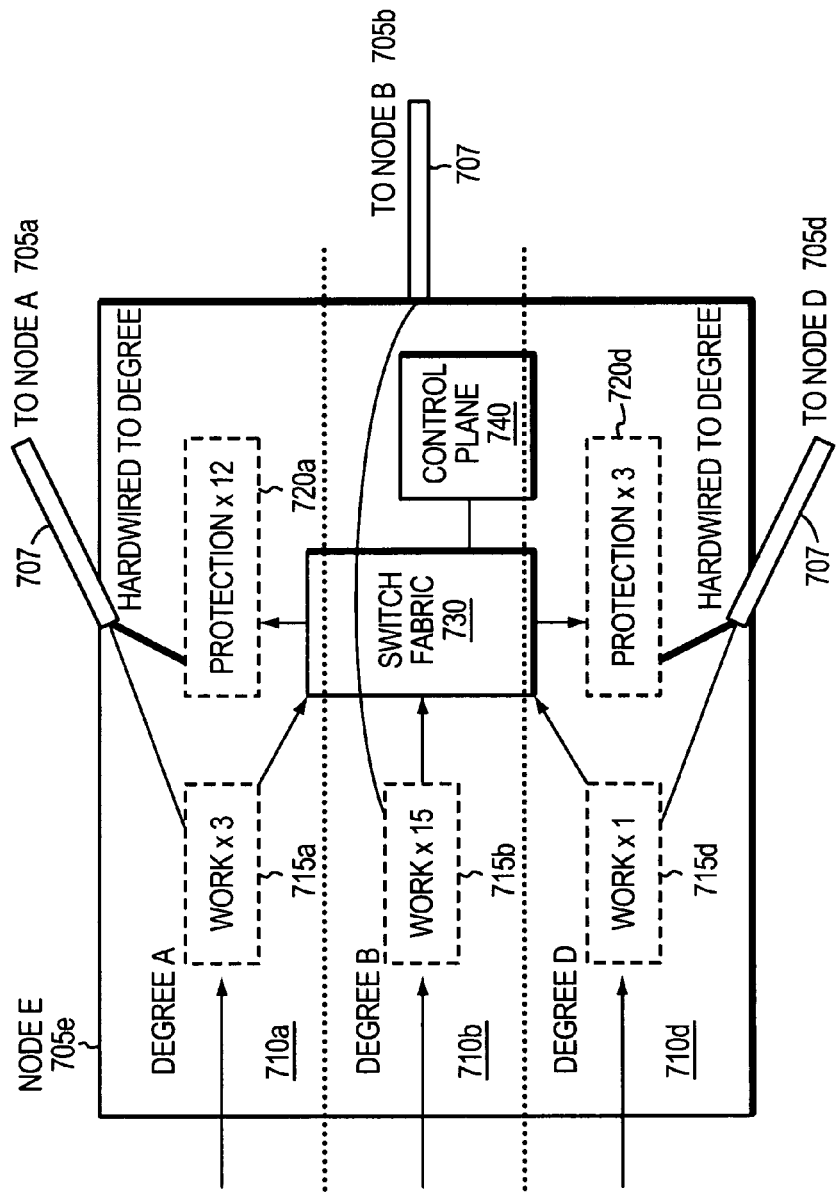
FIGS. 7A-7D are schematic diagrams of a network node in a mesh network that is configured to share protection transponders.

FIGS. 7A-7D are schematic diagrams of a network Node E 705e, such as network Node E 405e in the mesh network of FIG. 4, which is configured to share protection transponders according to an example embodiment of the present invention. FIG. 7A illustrates Node E 705e as including three degrees (Degree A 710a, Degree B 710b, and Degree D 710d). Each degree 710a,b,d is connected to a respective other node 705a,b,d in the network (i.e., Degree A 710a is connected to Node A 705a, Degree B 710b is connected to Node B 705b, and Degree D 710d is connected to Node D 705d). Each degree 710a,b,d may include a number of working transponders 715a,b,d and a number of protection transponders 720a,d. These transponders 715a,b,d, 720a,d are logically hardwired to their respective degree 710a,b,d, and only forward traffic to the node 705a,b,d in the network that is associated with their particular degree 710a,b,d. For example, protection transponders 720a of Degree A 705a may be used to setup protection paths from Node E 705e directly to Node A 705a, but not directly to Node B 705b or Node D 705d.

According to an example embodiment of the present invention, a network node having at least two degrees may include a first degree that is oriented in a first direction of a preconfigured protection cycle (p-cycle), and a second degree that is oriented in a second direction of the p-cycle. The first degree may include a first number of protection transponders logically hardwired to a first adjacent network node in the first direction of the p-cycle, and the second degree may include a second number of protection transponders logically hardwired to a second adjacent network node in the second direction of the p-cycle. Either the first number of protection transponders or the second number of protection transponders may be equal to a maximum number of working transponders of any other degree of the network node. Alternatively, the first and second numbers of protection transponders together may be equal to the maximum number of working transponders of any one of the other degrees of the network node.

FIG. 7A further illustrates a switch fabric 730 and a control plane 740, which are part of the network node 705e. The switch fabric 730 is electronically disposed between and connects the working transponders 715a,b,d to the protection transponders 720a,d. In the event of a failure of a connection 707 associated with a particular one of the degrees 710a,b,d, the control plane 740 may configure the switch fabric 730 to switch traffic from the working transponders 715a,b,d, of the particular degree via the switch fabric 730 to the protection transponders 720a,d of at least one of the remaining degrees.

Figure 7B:
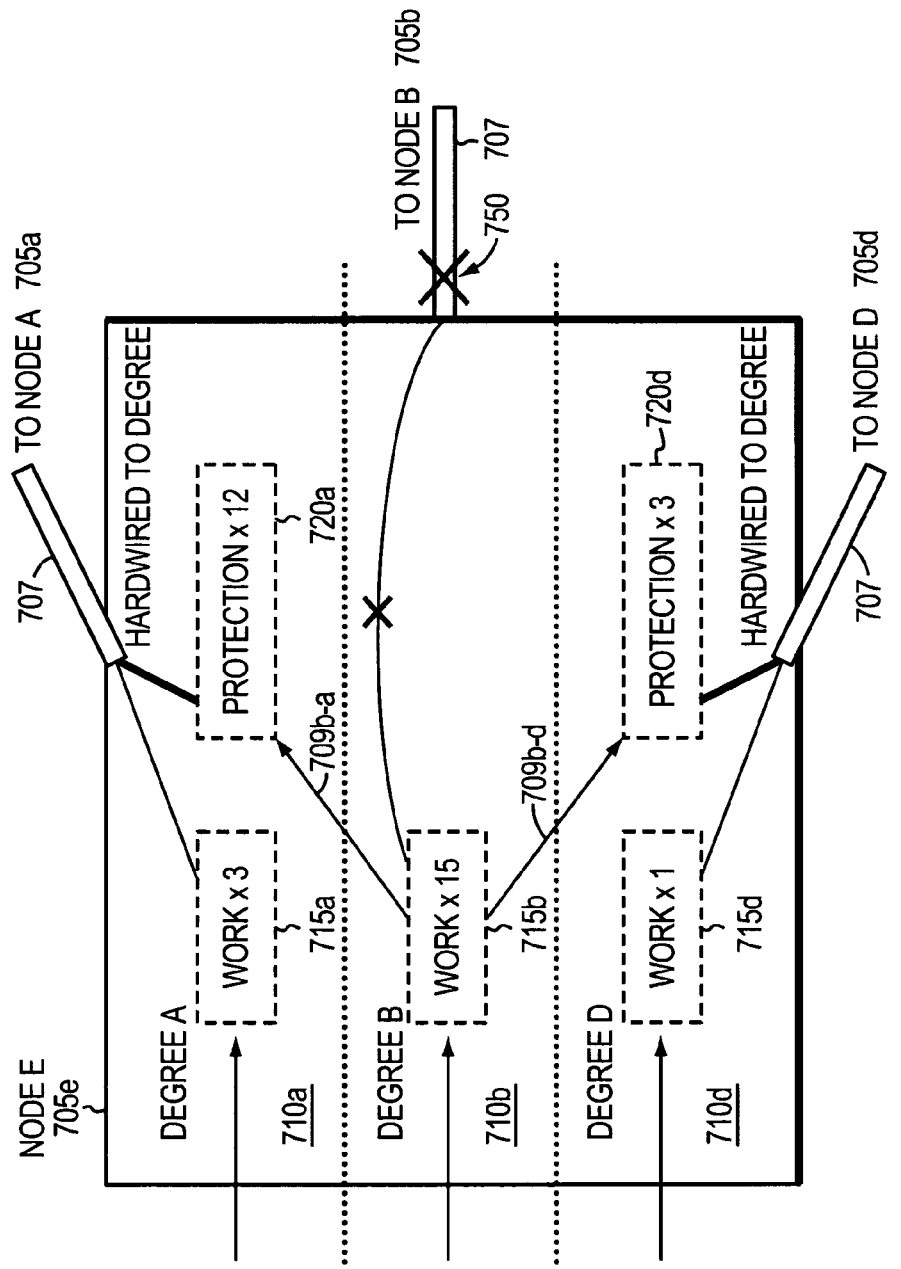

FIG. 7B shows a failure 750 on a connection 707 associated with Degree B 710b. As a result of the failure 750, traffic destined for Node B 705b is switched internally via paths 709b-a and 709b-d of the switch fabric (not shown) to the protection transponders 720a, 720d of Degree A 710a and Degree D 710d, respectively, which each forward at least a portion of the traffic to Node A 705a and Node D 705d, respectively, which are part of the p-cycle of the mesh network.

Figure 7C:
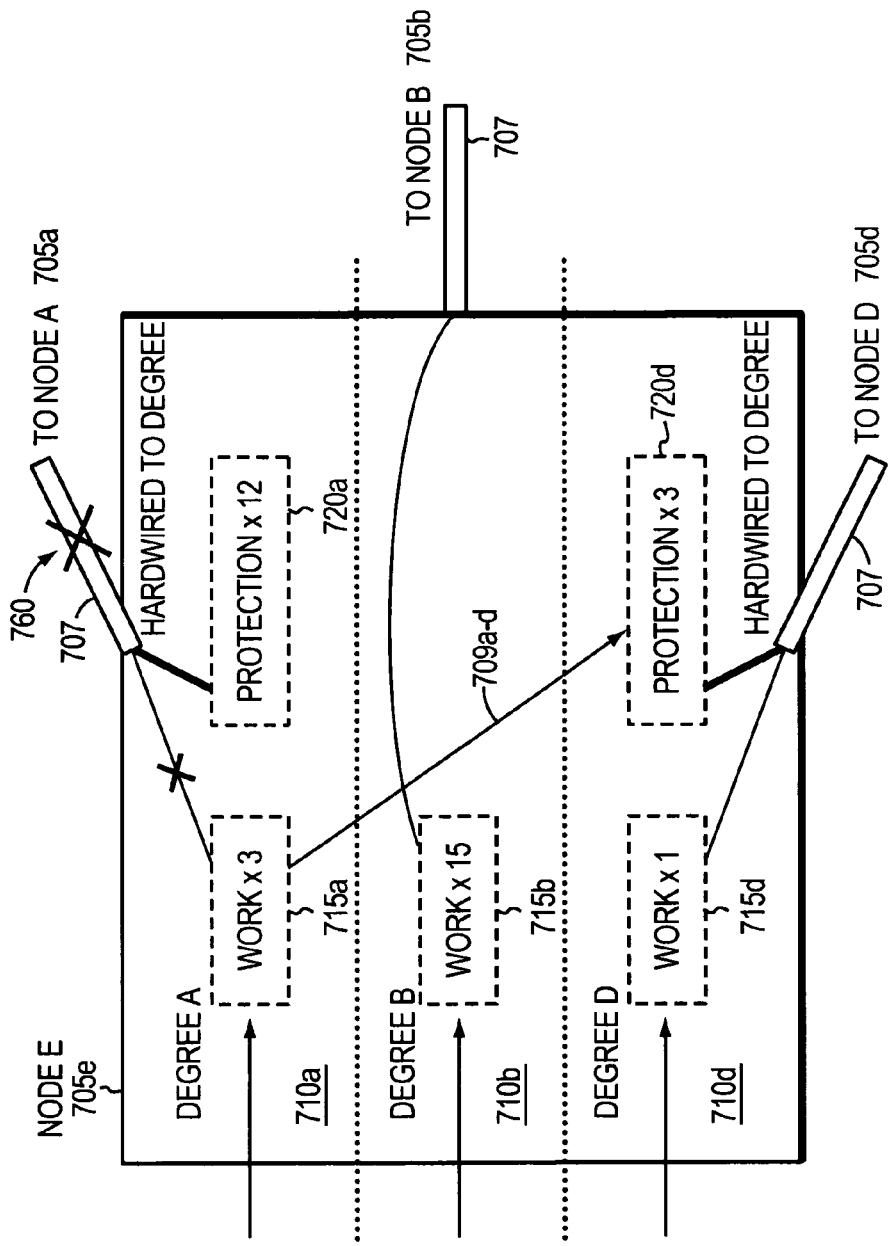

FIG. 7C shows a failure 760 on a connection 707 associated with Degree A 710a. As a result of the failure 760, traffic destined for Node A 705a is switched via a path 709a-d in the switch fabric (not shown) to the protection transponders 720d of Degree D 710d, which forward the traffic to Node D 705d, which is part of the p-cycle of the mesh network.

Figure 7D:
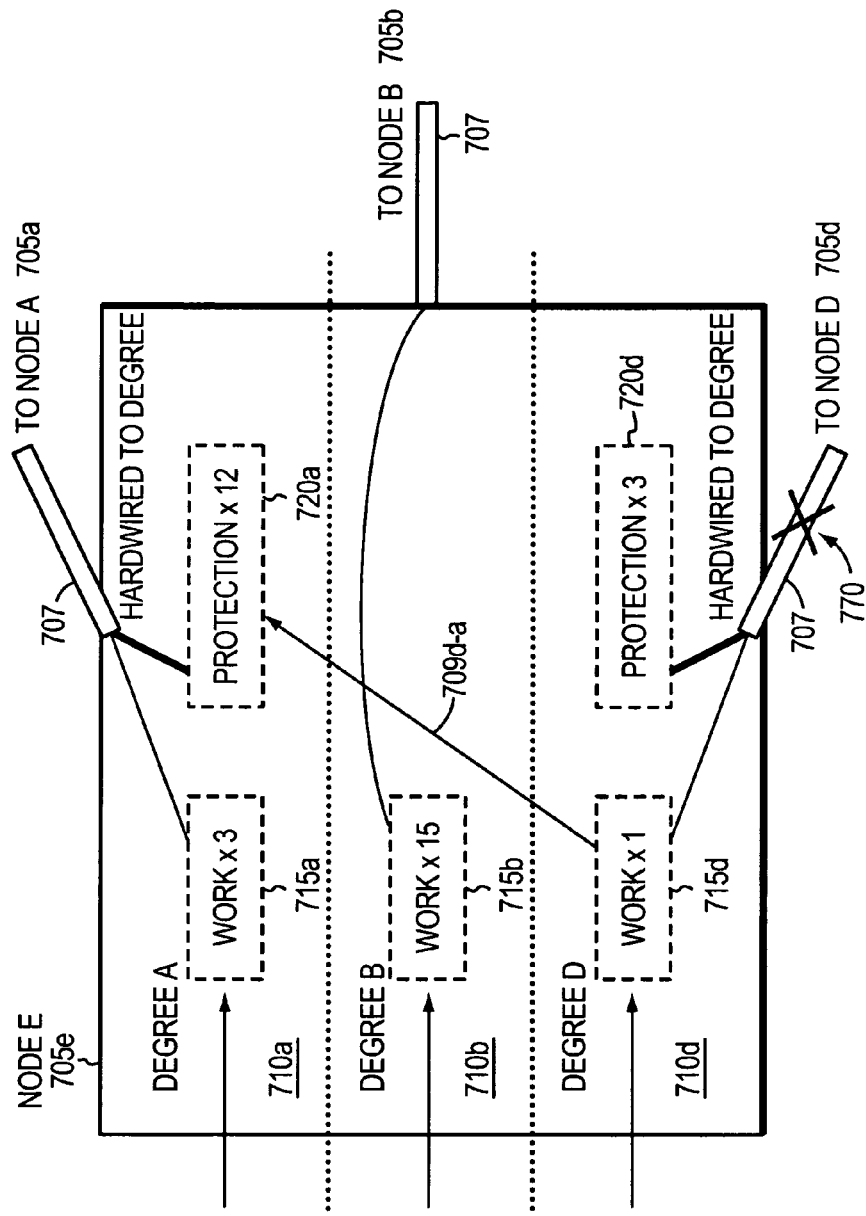

FIG. 7D shows a failure 770 on a connection 707 associated with Degree D 710d. As a result of the failure 770, traffic destined for Node D 705d is switched via a path 709d-a in the switch fabric (not shown) to the protection transponders 720a of Degree A, which forward the traffic to Node A 705a, which is part of the p-cycle of the mesh network.

While this invention has been particularly shown and described with references to example embodiments thereof, it will be understood by those skilled in the art that various changes in form and details may be made therein without departing from the scope of the invention encompassed by the appended claims.

It should be understood that the flow diagrams of FIGS. 5A and 5B are examples that can include more or fewer components, be partitioned into subunits, or be implemented in different combinations. Moreover, the flow diagrams may be implemented in hardware, firmware, or software. If implemented in software, the software may be written in any software language suitable for use in networks and network nodes as illustrated in FIGS. 1, 2A-2C, 3, 4, 6A-6I, and 7A-7D. The software may be embodied on any form of computer readable medium, such as RAM, ROM, or magnetic or optical disk, and loaded and executed by generic or custom processor(s). It should further be understood that the invention is applicable to any mesh network topology of any size and any connectivity.

What is claimed is:

1. A network node in a mesh network, comprising:
at least two degrees having working transponders, at least one of the degrees having protection transponders connected to at least one respective adjacent node along a preconfigured protection cycle in the mesh network, the protection transponders being of a number at least equal to the number of working transponders needing support in an event of a failure relating to any one of the degrees;
a switch fabric electronically disposed between the working and protection transponders to switch traffic simultaneously from working transponders of a given degree to protection transponders of multiple other degrees associated with at least two protection paths of the preconfigured protection cycle, in an event of a failure relating to the given degree; and a control plane to configure the switch fabric to switch traffic simultaneously from the working transponders of the given degree to the protection transponders of the multiple other degrees in the event of the failure relating to the given degree.

2. A network node as in claim 1 wherein a first degree is oriented in a first direction of the preconfigured protection cycle and a second degree is oriented in a second direction of the preconfigured protection cycle.

3. A network node as in claim 2 wherein the switch fabric, in an event of a failure relating to the first degree, switches traffic from the working transponders of the first degree to the protection transponders of the second degree.

4. A network node as in claim 2 wherein the switch fabric, in an event of a failure relating to a third degree having working transponders, switches traffic from the working transponders of the third degree to the protection transponders of the first degree.

5. A network node as in claim 2 wherein the switch fabric, in an event of a failure relating to a third degree having working transponders, switches traffic from the working transponders of the third degree to the protection transponders of the first degree and the protection transponders of the second degree.

6. A network node as in claim 5 wherein the switch fabric evenly distributes the traffic from the working transponders of the third degree between the protection transponders of the first degree and the protection transponders of the second degree.

7. A network node as in claim 2 wherein the first degree includes a first number of protection transponders hardwired to a first adjacent network node in the first direction of the preconfigured protection cycle, the first number of protection transponders being equal to a maximum number of working transponders of any other degree of the network node.

8. A network node as in claim 7 wherein the second degree includes a second number of protection transponders hardwired to a second adjacent network node in the second direction of the preconfigured protection cycle, the second number of protection transponders being equal to a maximum number of working transponders of any other degree of the network node.

9. A network node as in claim 2 wherein the first degree includes a first number of protection transponders hardwired to a first adjacent network node in the first direction of the preconfigured protection cycle, and the second degree includes a second number of protection transponders hardwired to a second adjacent network node in the second direction of the preconfigured protection cycle, the first and second number of protection transponders together being equal to a maximum number of working transponders of any degree of the network node.

10. A network node as in claim 1 further including at least one additional degree having additional respective working and protection transponders, the additional protection transponders connecting an additional adjacent node along an additional preconfigured protection cycle in the mesh network.

11. A mesh network, comprising:
a preconfigured protection cycle including a plurality of network nodes, each network node of the preconfigured protection cycle including:
at least two degrees having working transponders, at least one of the degrees having protection transponders connected to at least one respective adjacent node along the preconfigured protection cycle, the protection transponders being of a number at least equal to the number of working transponders needing support in an event of a failure relating to any one of the degrees;
a switch fabric electronically disposed between the working and protection transponders to switch traffic simultaneously from working transponders of a given degree to protection transponders of multiple other degrees associated with at least two protection paths of the preconfigured protection cycle, in an event of a failure relating to the given degree; and
a control plane to configure the switch fabric to switch traffic simultaneously from the working transponders of the given degree to the protection transponders of the multiple other degrees in the event of the failure relating to the given degree.

12. A mesh network as in claim 11 further including at least one additional preconfigured protection cycle including a plurality of network nodes.

13. A mesh network as in claim 12 wherein the plurality of network nodes of the additional preconfigured protection cycle includes a subset of the plurality of network nodes of the original preconfigured protection cycle.

14. A mesh network as in claim 13 wherein a node that is both part of the original preconfigured protection cycle and part of the additional preconfigured protection cycle includes multiple degrees having protection transponders.

* * * * *